United States Patent
Jung et al.

(10) Patent No.: US 7,719,756 B2
(45) Date of Patent: May 18, 2010

(54) DISPLAY APPARATUS

(75) Inventors: Mee-Hye Jung, Suwon-si (KR);
Jae-Byung Park, Seongnam-si (KR);
Chong-Chul Chai, Seoul (KR);
Il-Pyung Lee, Suwon-si (KR);
Kwang-Chul Jung, Seongnam-si (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 3 days.

(21) Appl. No.: 12/272,674

(22) Filed: Nov. 17, 2008

(65) Prior Publication Data
US 2009/0207475 A1 Aug. 20, 2009

(30) Foreign Application Priority Data
Feb. 19, 2008 (KR) ...................... 10-2008-0014943

(51) Int. Cl.
*G02B 26/00* (2006.01)
*G09G 3/34* (2006.01)
*G03G 17/04* (2006.01)
(52) U.S. Cl. .......................... 359/296; 345/107; 430/32
(58) Field of Classification Search ................ 359/296; 345/107; 430/31–32; 349/33
See application file for complete search history.

(56) References Cited

U.S. PATENT DOCUMENTS

| 2003/0058521 | A1* | 3/2003 | Kawai | 359/296 |
| 2008/0037106 | A1* | 2/2008 | Song | 359/296 |

FOREIGN PATENT DOCUMENTS

| JP | 2002-229074 | 8/2002 |
| KR | 2006-0011621 | 2/2006 |
| KR | 2007-0052812 | 5/2007 |
| KR | 2007-0063102 | 6/2007 |

\* cited by examiner

*Primary Examiner*—Scott J Sugarman
*Assistant Examiner*—Dawayne A Pinkney
(74) *Attorney, Agent, or Firm*—Innovation Counsel LLP (57) ABSTRACT

A display apparatus according to one or more embodiments includes an array substrate and an opposite substrate facing the array substrate. Pixels areas are defined in the array substrate, and each pixel area includes a pixel electrode having concave-convex patterns at the edges thereof when viewed in a plan view. The concave-convex patterns vary directions of fringe fields generated from the edges of the pixel electrode, so that an area in which a fringe field is formed relative to one pixel area may be prevented from overlapping with a peripheral pixel area.

20 Claims, 12 Drawing Sheets

DISPLAY APPARATUS

CROSS-REFERENCE TO RELATED APPLICATION

This application claims priority to and benefit from Korean Patent Application No. 2008-14943 filed on Feb. 19, 2008, the contents of which are herein incorporated by reference in its entirety.

BACKGROUND

1. Technical Field

Embodiments of the present invention generally relate to a display apparatus. More particularly, embodiments of the present invention relate to a display apparatus having an improved display quality.

2. Description of the Related Art

In general, a display apparatus displays an image corresponding to an external input signal in a pixel area. The display apparatus includes first and second substrates facing each other.

An electrophoretic display apparatus further includes an electrophoretic layer interposed between two substrates facing each other. The two substrates have first and second electrodes, respectively, and the electrophoretic layer includes first and second particles controlled by an electric field formed between the first and second electrodes.

The first and second particles have colors different from each other, and are charged with polarities different from each other. Thus, if the electric field is formed between the first and second electrodes, the first and second particles are electrophoresed, so that an alignment state of the first and second particles varies.

Furthermore, when the electric field is formed between the first and second electrodes, a fringe field having a curved shape is generated at an edge of the first or second electrode. The fringe field exerts influence on the electrophoretic layer corresponding to a peripheral pixel area. Thus, an undesired color is displayed in the peripheral pixel area, so that display quality of the electrophoretic display apparatus deteriorates.

SUMMARY

An exemplary embodiment of the present invention provides an electrophoretic display apparatus having an improved display quality.

Another exemplary embodiment of the present invention provides a display apparatus having an improved display quality.

In an exemplary embodiment of the present invention, an electrophoretic display apparatus includes a first substrate in which pixel areas are defined, a second substrate facing the first substrate and an electrophoretic layer interposed between the first and second substrates. Pixel electrodes are provided in the pixel areas, respectively. When viewed in a plan view, the pixel electrode has concave-convex patterns at the edges thereof.

In another exemplary embodiment of the present invention, a display apparatus includes a first substrate including gate lines, data lines and a semiconductor layer, a second substrate facing the first substrate, and pixel electrodes provided in pixel areas defined by gate lines crossing the data lines. The second substrate includes a common electrode provided thereon and color filters provided corresponding to the pixel areas. When viewed in a plan view, the pixel electrode includes concave-convex patterns having convex sections and concave sections at the edges thereof.

According to the above, when viewed in a plan view, the concave-convex patterns formed at the edges of the pixel electrode vary the directions of the fringe fields generated from the edges of the pixel electrode, so that an area in which the fringe field is formed relative to one pixel area may be prevented from overlapping with a peripheral pixel area.

BRIEF DESCRIPTION OF THE DRAWINGS

The above and other advantages of one or more embodiments of the present invention will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected to or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the embodiments of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein are interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Figure 1:
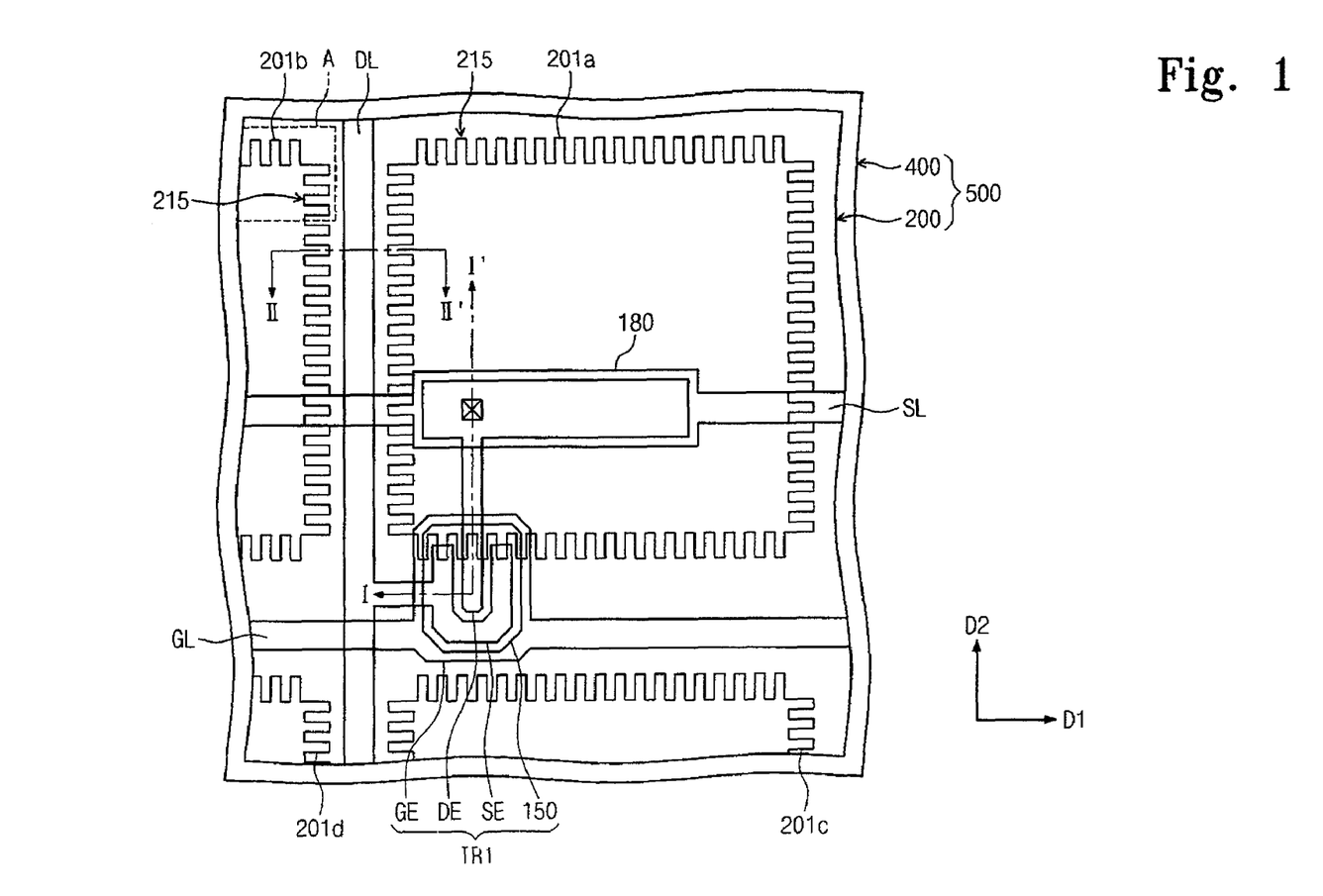
FIG. 1 is a plan view showing an exemplary embodiment of an electrophoretic display apparatus according to an embodiment of the present invention.

FIG. 1 is a plan view showing an exemplary embodiment of an electrophoretic display apparatus according to an embodiment of the present invention.

Referring to FIG. 1, the electrophoretic display apparatus 500 includes an array substrate 200 and an opposite substrate 400 facing the array substrate 200. The electrophoretic display apparatus 500 further includes an electrophoretic layer interposed between the array substrate 200 and the opposite substrate 400. The electrophoretic layer includes first electrophoretic capsules 250 (see, FIG. 4) and second electrophoretic capsules 251 (see, FIG. 4). The first and second electrophoretic capsules are influenced by the electric field generated between the array substrate 200 and the opposite substrate 400, so that the electrophoretic display apparatus 500 may display a desired image.

The array substrate 200 includes a gate line GL that extends in the first direction D1 and a data line DL that extends in the second direction D2 substantially perpendicular to the first direction D1. The gate line GL crosses the data line DL, thereby defining pixel areas in a matrix configuration. Pixel electrodes are arranged in the pixel areas, respectively. In the present exemplary embodiment, as shown in FIG. 1, four pixel electrodes, i.e., first to fourth pixel electrodes 201a to 201d, are representatively illustrated since the pixel electrodes have the same structure and function.

The array substrate 200 further includes thin film transistors electrically connected with the first to fourth pixel electrodes 201a to 201d, respectively. For example, FIG. 1 shows a first thin film transistor TR1 electrically connected with the first pixel electrode 201a.

The first thin film transistor TR1 includes a gate electrode GE, a source electrode SE, a drain electrode DE and a semiconductor pattern 150. The gate electrode GE branches from the gate line GL, and the source electrode SE branches from the data line DL to overlap with the gate electrode GE. The drain electrode DE is spaced apart from the source electrode SE to overlap with the gate electrode GE.

The array substrate 200 further includes a storage line SL spaced apart from the gate line GL, and a storage electrode 180 that branches from the storage line SL. The storage electrode 180 overlaps with the first pixel electrode 201a, thereby forming a storage capacitor together with the first pixel electrode 201a.

When viewed in a plan view, concave-convex patterns 215 are formed in edges of the first to fourth pixel electrodes 201a to 201d, respectively. Hereinafter, a structure of the concave-convex pattern 215 will be described in detail with reference to FIGS. 2A and 2B according to one or more embodiments.

Figure 2A:
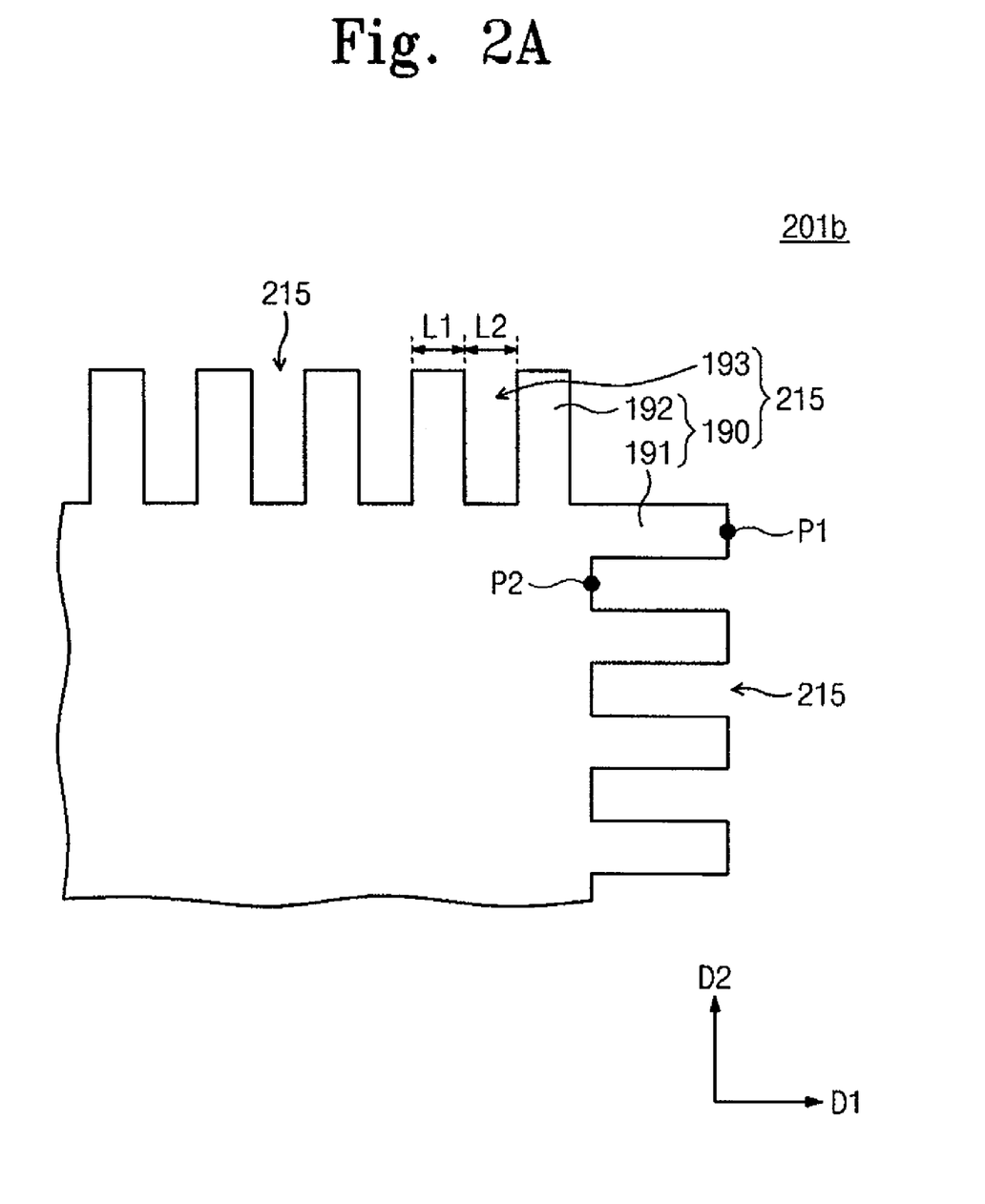
FIG. 2A is an enlarged plan view of a portion "A" shown in FIG. 1.
Figure 2B:
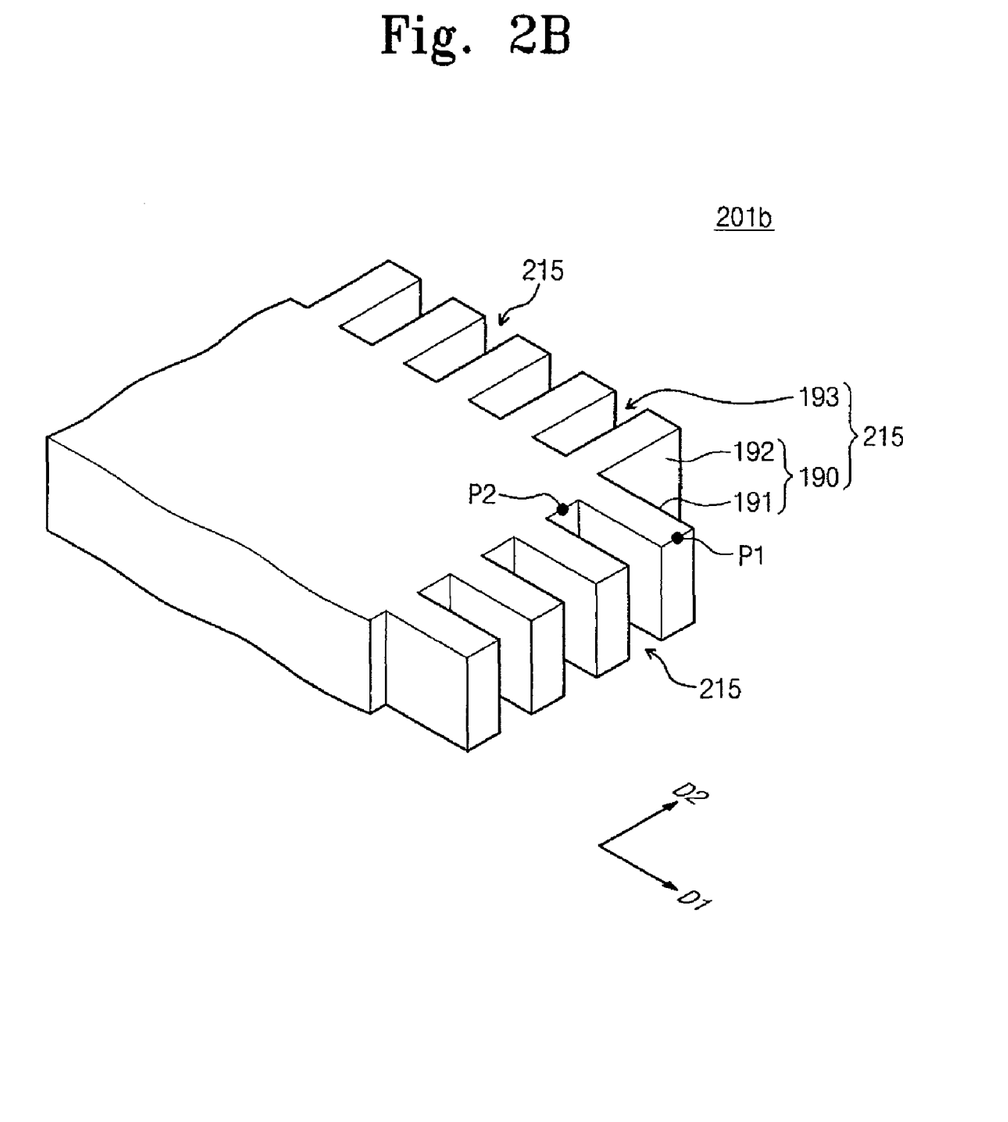
FIG. 2B is an enlarged perspective view of a portion "A" shown in FIG. 1.

FIG. 2A is an enlarged plan view of a portion "A" shown in FIG. 1, and FIG. 2B is an enlarged perspective view of a portion "A" shown in FIG. 1. FIGS. 2A and 2B show only the second pixel electrode 201b as an example.

Referring to FIGS. 2A and 2B, the concave-convex patterns 215 formed in the second pixel electrode 201b are defined by convex sections 190, which protrude from the edges of the second pixel electrode 201b, and concave sections 193 formed by partially removing the edges. In more detail, the convex section 190 includes first and second convex sections 191 and 192 that protrude from the edges of the second pixel electrode 201b in the first direction D1 and the second direction D2, respectively.

When viewed in a plan view, each of the first and second convex sections 191 and 192 may have a rectangular shape. When viewed in a plan view, each of the first and second convex sections 191 and 192 may have a width of a first length L1 of about 3 μm to about 6 μm. Further, when viewed in a plan view, the two adjacent first convex sections 191 may be spaced apart from each other by a second length L2 of about 3 μm to about 6 μm. Similarly, when viewed in a plan view, the two adjacent second convex sections 192 may be spaced apart from each other by about 3 μm to about 6 μm.

Hereinafter, a specific top point of the first convex section 191 will be referred to as a first point "P1" and a specific bottom point of the concave section will be referred to as a second point "P2." The direction of the fringe field generated at the first point P1 is different from that of the fringe field generated at the second point P2. The detailed descriptions of the directions of the fringe field generated at the first and second points P1 and P2 will be given with reference to FIG. 4 according to one or more embodiments.

Figure 3:
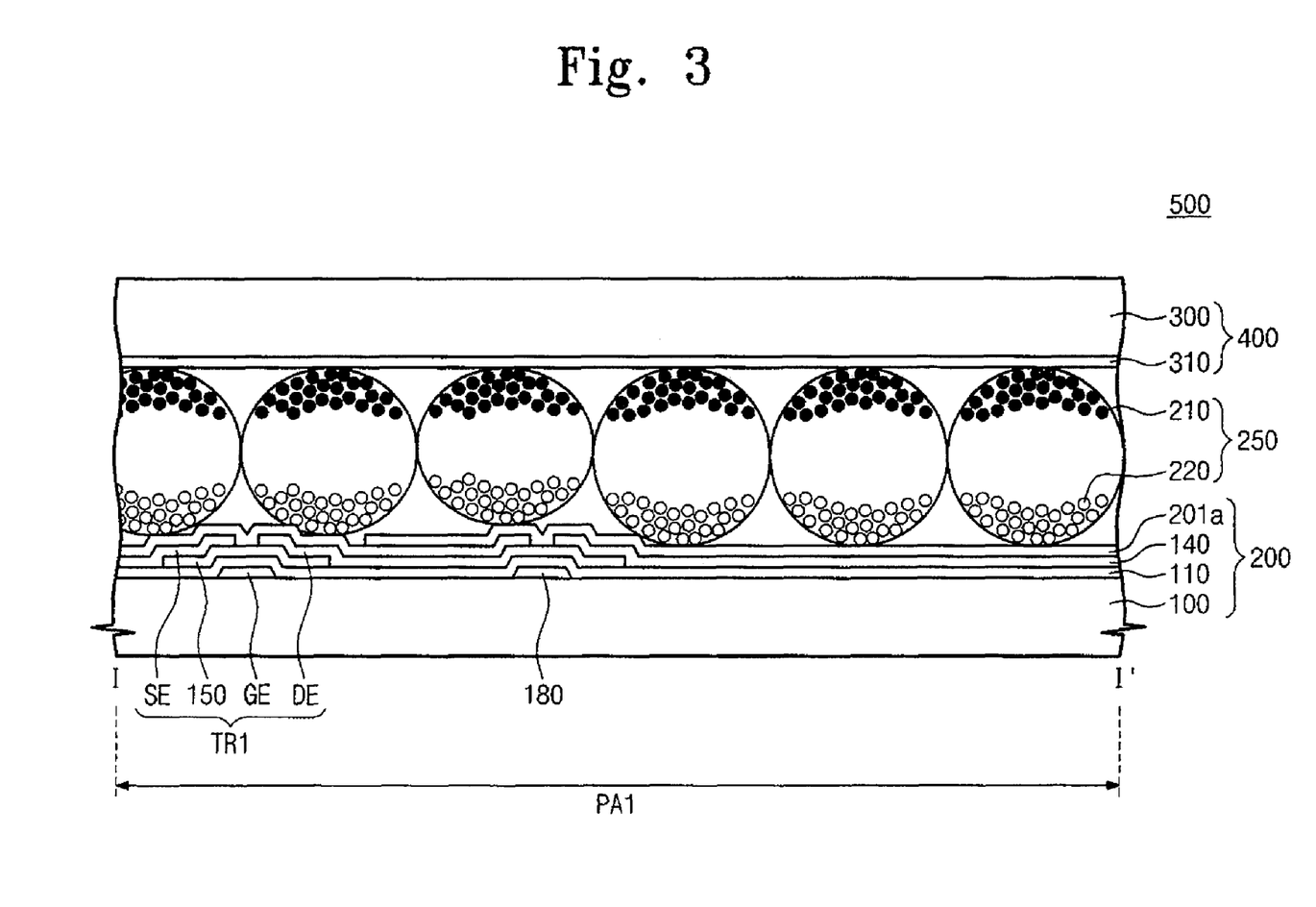
FIG. 3 is a sectional view taken along line I-I' shown in FIG. 1.

FIG. 3 is a sectional view taken along line I-I' shown in FIG. 1.

Referring to FIG. 3, the array substrate 200 includes a first base substrate 100. The first thin film transistor TR1 is provided on the first base substrate 100. As described above, the first thin film transistor TR1 includes the gate electrode GE, the semiconductor pattern 150, the source electrode SE and the drain electrode DE. A gate insulating layer 110 is arranged between the gate electrode GE and the semiconductor pattern 150.

Furthermore, an interlayer dielectric layer 140 is provided on the first thin film transistor TR1, and the first pixel electrode 201a is provided on the interlayer dielectric layer 140. An overlapping portion between the interlayer dielectric layer 140 and the drain electrode DE is partially removed, so that the drain electrode DE may be electrically connected with the first pixel electrode 201a.

FIG. 3 shows an area in which the first pixel electrode 201a is provided in the array substrate 200. For convenience of description, an area, on which an image is displayed by the first pixel electrode 201a, will be referred to as a first pixel area "PA1."

The opposite substrate 400 includes a second base substrate 300, and a common electrode 310 is provided below the second base substrate 300. The common electrode 310 forms the electric field between the array substrate 200 and the opposite substrate 400 together with the first pixel electrode 201a.

First electrophoretic capsules 250 are positioned between the array substrate 200 and the opposite substrate 400 in correspondence with the first pixel area PA1. Each of the first electrophoretic capsules 250 includes first black particles 210 and first white particles 220, which are charged with polarities different from each other. Thus, as the first electrophoretic capsules 250 are influenced by the electric field generated by the first pixel electrode 201a and the common electrode 310, the first black particles 210 and the first white particles 220 are arranged in the first electrophoretic capsules 250 in the direction of the electric field.

For example, if the first black particles 210 and the first white particles 220 are charged with positive and negative polarities, respectively, and the electric field is formed between the first pixel electrode 201a and the common electrode 310 in the direction from the first pixel electrode 201a to the common electrode 310, the first black particles 210 and the first white particles 220 move in the first electrophoretic capsules 250 toward the common electrode 310 and the first pixel electrode 201a, respectively. Thus, light advancing toward the first electrophoretic capsules 250 through the opposite substrate 400 is reflected by the first black particles 210, so that a color of the first black particles 210 is displayed on the first pixel area PA1.

Figure 4:
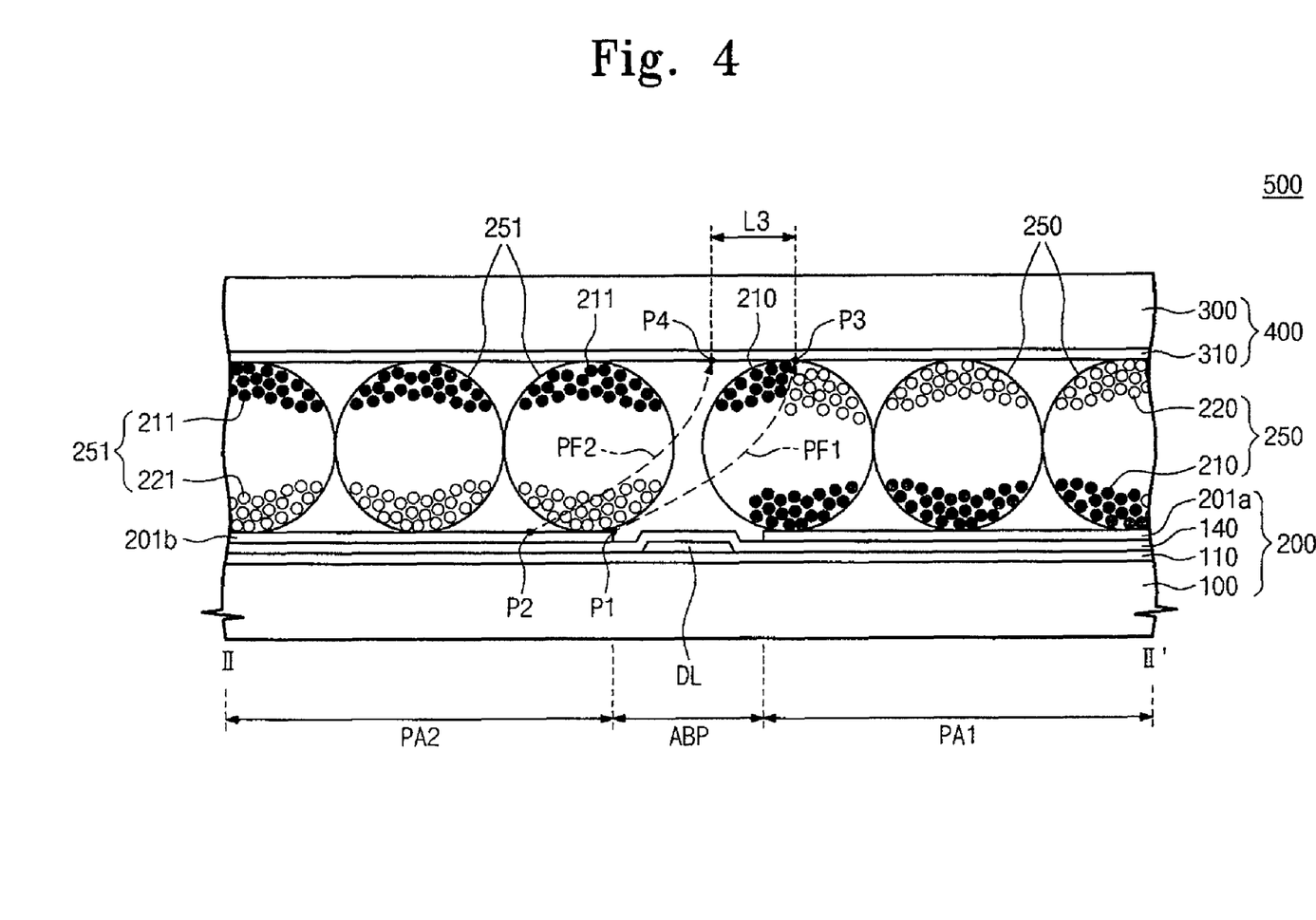
FIG. 4 is a sectional view taken along line II-II' shown in FIG. 1.

FIG. 4 is a sectional view taken along line II-II' shown in FIG. 1.

Referring to FIG. 4, the gate line GL is positioned on the first base substrate 100 in correspondence with an area between pixels (ABP). The gate insulating layer 110 and the interlayer dielectric layer 140 are provided on the gate line GL. Furthermore, in the first pixel area PA1, the first pixel electrode 201a may be provided on the interlayer dielectric layer 140. In the second pixel area PA2, the second pixel electrode 201b may be provided on the interlayer dielectric layer 140. In addition, the first and second electrophoretic capsules 250 and 251 are positioned between the array substrate 200 and the opposite substrate 400. In more detail, the first electrophoretic capsules 250 are positioned corresponding to the first pixel area PA1, and the second electrophoretic capsules 251 are positioned corresponding to the second pixel area PA2. Each of the second electrophoretic capsules 251 includes second black particles 211 and second white particles 221 charged with a polarity different from that of the second black particles 211.

When the second electrophoretic capsules 251 are arranged by the electric field formed between the second pixel electrode 201b and the common electrode 310 and thus a predetermined color is displayed on the second pixel area PA2, a part of the particles 210 and 220 of the first electrophoretic capsules 250 may be influenced by the fringe fields generated from edges of the second pixel electrode 201b.

However, concave-convex patterns 215 (see, FIG. 1) formed in the second pixel electrode 201b reduce influence of the fringe fields generated from the edges of the second pixel electrode 201b, thereby preventing the first electrophoretic capsules 250 from being influenced by the fringe fields. Thus, light leakage phenomenon is reduced, in which a color displayed on the second pixel area PA2 is displayed on the ABP or the first pixel area PA1.

For instance, if the electric field is formed in a direction from the second pixel electrode 201b to the common electrode 310 due to the potential difference generated between the second pixel electrode 201b and the common electrode 310, the second black particles 211 charged with the positive polarity would move toward the common electrode 310 and the second white particles 221 charged with the negative polarity would move toward the second pixel electrode 201b. Thus, the black color of the first black particles 210 would be displayed on the second pixel area PA2.

Meanwhile, first and second fringe fields PF1 and PF2 are generated from the edges of the second pixel electrode 201b. In more detail, the first fringe field PF1 is formed in the direction from the first point P1 of the second pixel electrode 201b to a third point P3 of the common electrode 310, and the second fringe field PF2 is formed from the second point P2 of the second pixel electrode 201b to a fourth point P4 of the common electrode 310. In detail, when the second fringe field PF2 reaches the common electrode 310, the second fringe field PF2 is closer to the second electrophoretic capsules 251 than the first fringe field PF1 by a third length L3.

A part of the fringe fields generated from the edges of the second pixel electrode 201b may exert influence on the first electrophoretic capsules 250. As shown in FIG. 4, since an area subject to the first fringe field PF1 partially overlaps with the first electrophoretic capsules 250 corresponding to the first pixel electrode 201a, the first fringe field PF1 may partially exert influence on the first electrophoretic capsules 250. Thus, a part of the first black particles 210 may move toward the common electrode 310 by the first fringe field PF1. However, since an area subject to the second fringe field PF2 does not overlap with an area including the first electrophoretic capsules 250, the second fringe field PF2 does not exert influence on the first electrophoretic capsules 250.

According to the present exemplary embodiment of the present invention as described above, the concave-convex patterns 215 (see, FIG. 1) are formed in the edges of the second pixel electrode 201b, so that the first pixel area PA1 is prevented from being influenced by the fringe fields generated from the edges of the second pixel electrode 201b. Thus, the directions of the fringe fields may be partially induced such that the light leakage phenomenon is avoided. Consequently, the concave-convex patterns 215 are formed in the second pixel electrode 201b, so that the sum of the intensities of the fringe fields, which cause the light leakage phenomenon, may be reduced without changing the sum of the intensities of the fringe fields generated from the edges of the second pixel electrode 201b.

Figure 5:
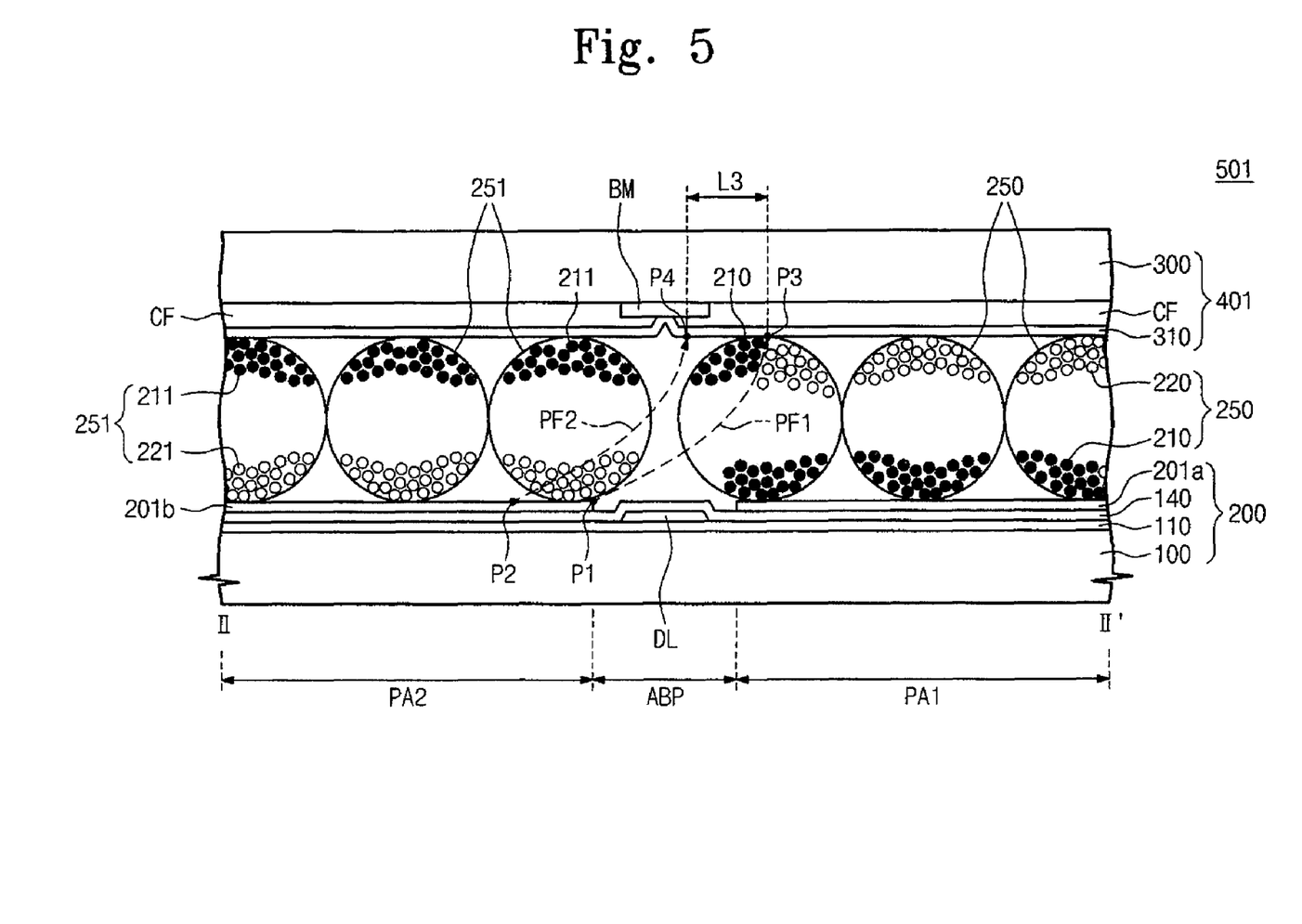
FIG. 5 is a sectional view showing another exemplary embodiment of an electrophoretic display apparatus according to an embodiment of the present invention.

FIG. 5 is a sectional view showing another exemplary embodiment of an electrophoretic display apparatus according to an embodiment of the present invention. In describing FIG. 5, the same reference numerals denote the same elements in FIG. 4, and thus, detailed descriptions of the same elements will be omitted in order to avoid redundancy.

Referring to FIG. 5, the electrophoretic display apparatus 501 includes an array substrate 200, a color filter substrate 401, a first electrophoretic capsule 250 and a second electrophoretic capsule 251.

The color filter substrate 401 includes a second base substrate 300, a black matrix BM, color filters CF and a common electrode 310.

The black matrix BM is provided corresponding to an ABP and the color filters CF are formed corresponding to first and second pixel areas PA1 and PA2, respectively. The color filter CF may include one of a red filter, a green filter or a blue filter. The color filter CF may filter light, which is incident through the color filter substrate 401 and reflected to an exterior from the first and second electrophoretic capsules 250 and 251, such that the light may have a predetermined color. Further, in the present exemplary embodiment, the color filters CF are provided in the color filter substrate 401. Alternatively, the color filters may be provided in the array substrate 200.

The array substrate 200 provided in the electrophoretic display apparatus 500 (see, FIG. 1) has the same structure as that of the array substrate 200 provided in the electrophoretic display apparatus 501. In detail, concave-convex patterns 215 as shown in FIGS. 2A and 2B according to an embodiment are formed at edges of first and second pixel electrodes 201a and 201b provided in the electrophoretic display apparatus 501. Thus, the light leakage phenomenon described with reference to FIG. 4 may be prevented from being generated in the electrophoretic display apparatus 501.

FIGS. 6 to 11 are plan views showing various exemplary embodiments of pixel electrodes provided in an electrophoretic display apparatus according to various embodiments of the present invention. When viewed in the plan views, concave-convex patterns are formed at edges of the pixel electrodes 202 to 207 shown in FIGS. 6 to 11, respectively. However, the concave-convex patterns have shapes different from each other. The pixel electrodes shown in FIGS. 6 to 11 according to various embodiments may distribute the directions of fringe fields generated from the edges of the pixel electrodes, thereby preventing the light leakage phenomenon from being generated in the electrophoretic display apparatus 501, similarly to the first to fourth pixel electrodes 201a to 201d shown in FIG. 1. Hereinafter, the pixel electrodes 202 to 207 will be described with reference to FIGS. 6 to 11 according to various embodiments while focusing on the structural characteristics thereof.

Figure 6:
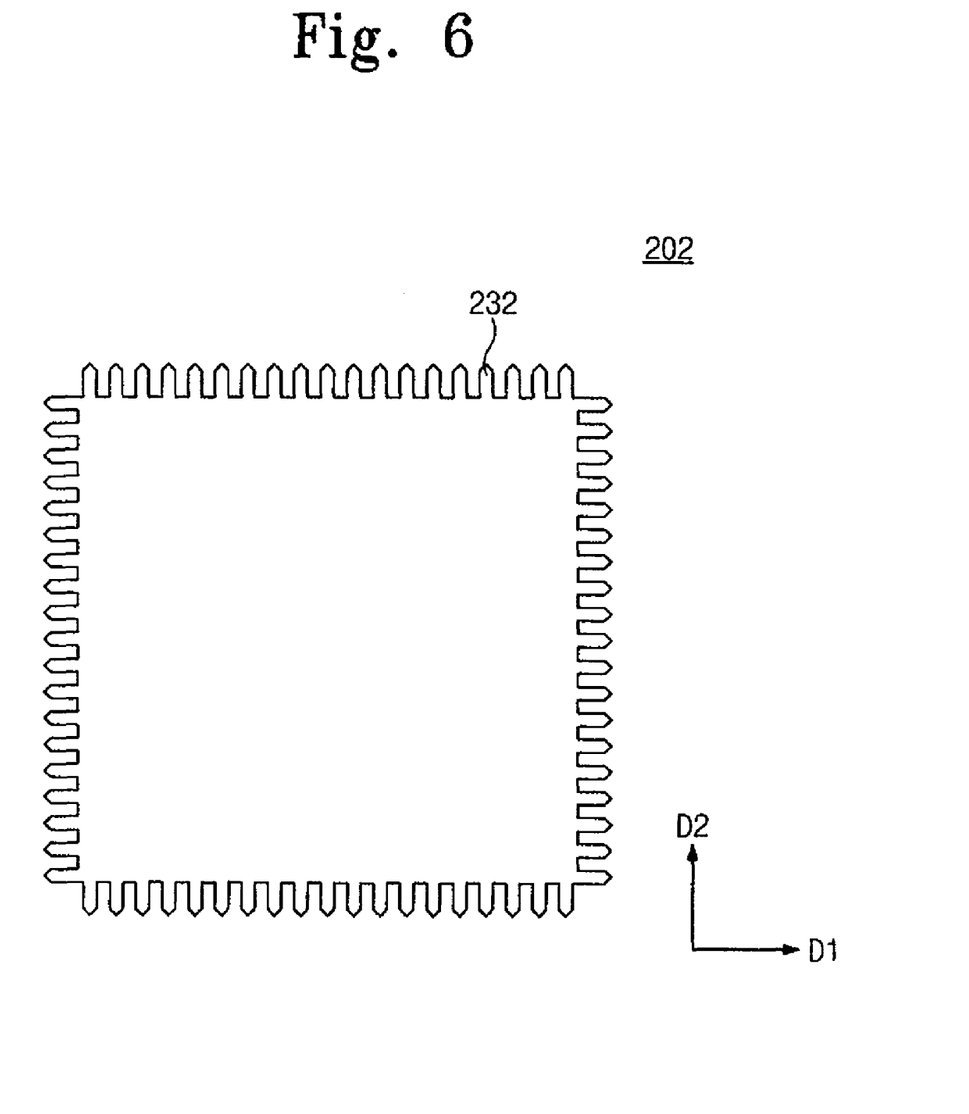
FIGS. 6 to 11 are plan views showing various exemplary embodiments of pixel electrodes provided in an electrophoretic display apparatus according to various embodiments of the present invention.

Referring to FIG. 6, when viewed in the plan view, the concave-convex patterns are formed at the edges of the pixel electrode 202. The concave-convex patterns are defined by convex sections 232 having chamfered edges. In more detail, when viewed in the plan view, the edges of the convex sections 232 are chamfered such that the edges are inclined with respect to the first and second directions D1 and D2.

Figure 7:
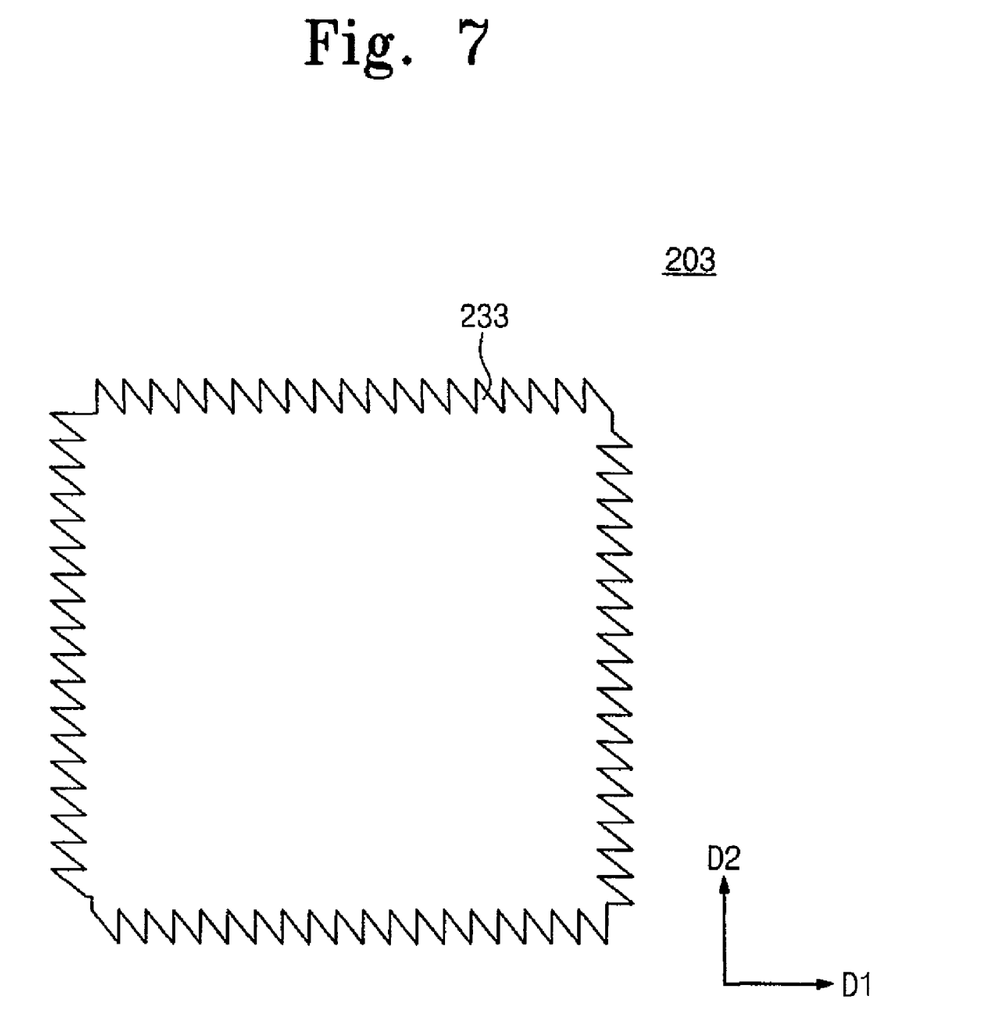

Referring to FIG. 7, when viewed in the plan view, the concave-convex patterns are formed at the edges of the pixel electrode 203. The concave-convex patterns are defined by convex sections 233 having a saw-tooth shape. In particular, when viewed in the plan view, each of the convex sections 233 has a right-angled triangular shape.

Figure 8:
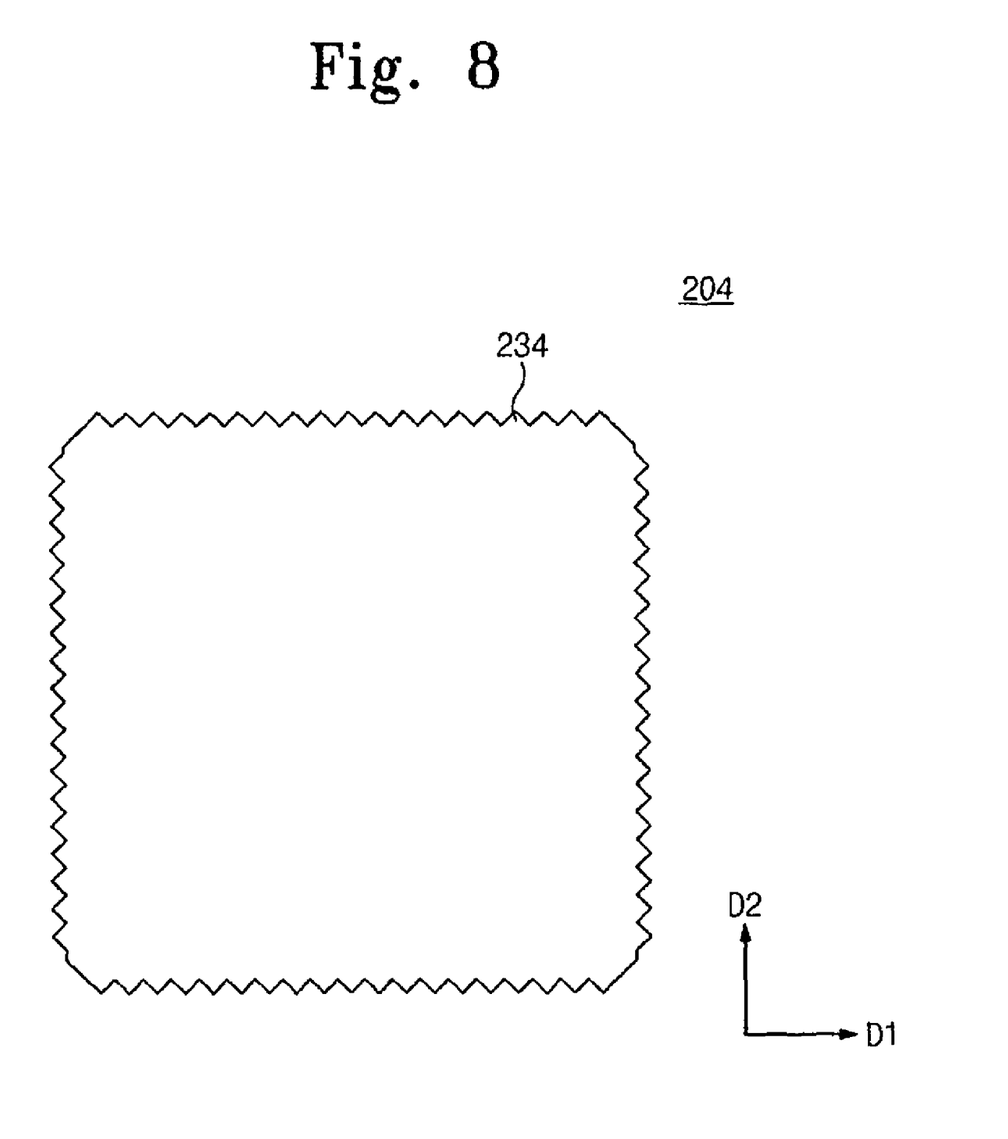

Referring to FIG. 8, when viewed in the plan view, the concave-convex patterns are formed at the edges of the pixel electrode 204. The concave-convex patterns are defined by convex sections 234 having a triangular shape. Particularly, when viewed in the plan view, each of the convex sections 234 has an inclined triangular shape.

Figure 9:
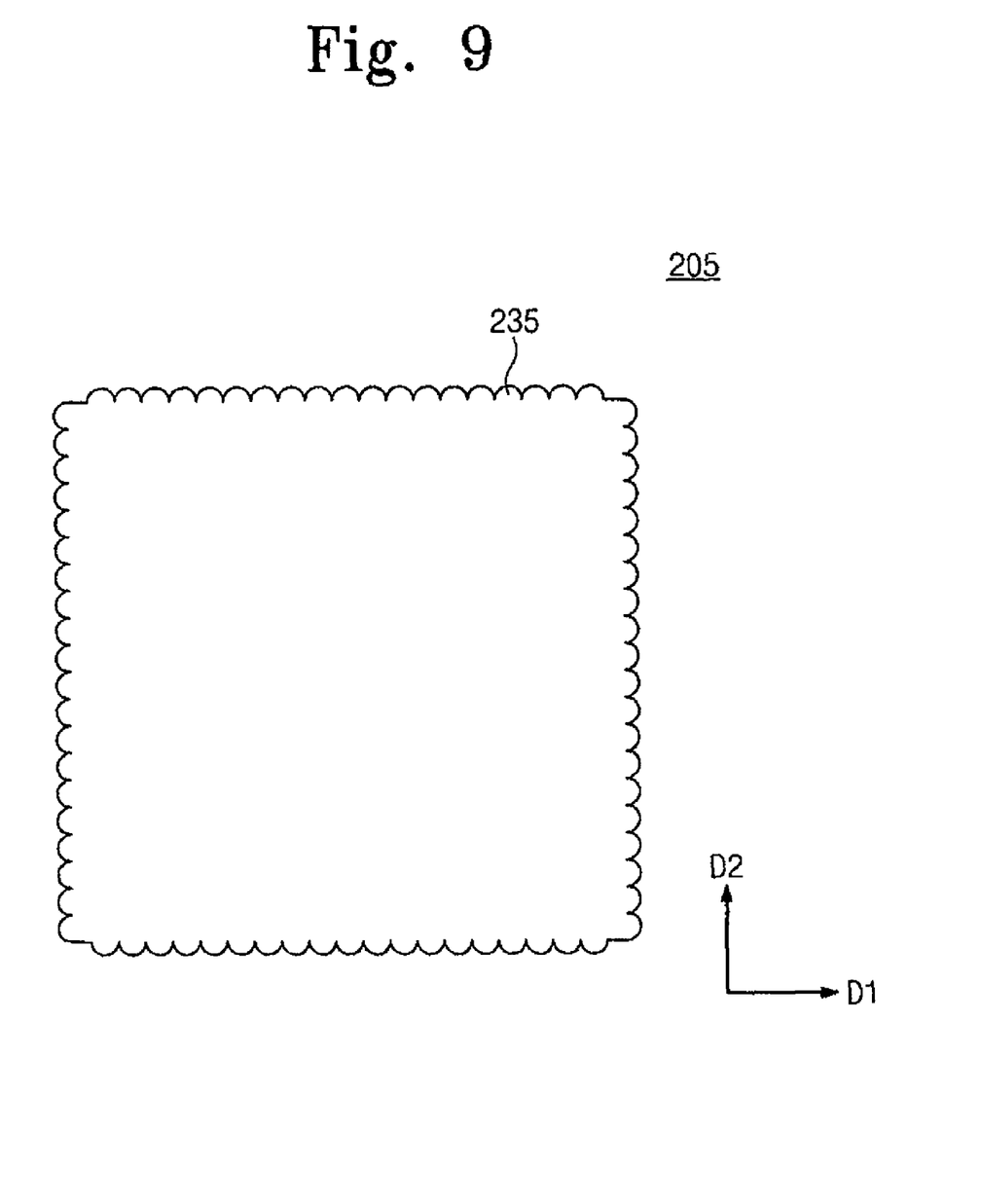

Referring to FIG. 9, when viewed in the plan view, the concave-convex patterns are formed at the edges of the pixel electrode 205. The concave-convex patterns are defined by convex sections 235 having a hemispheric shape. In more detail, when viewed in the plan view, the convex sections 235 protrude in the first or second direction D1 and D2.

Figure 10:
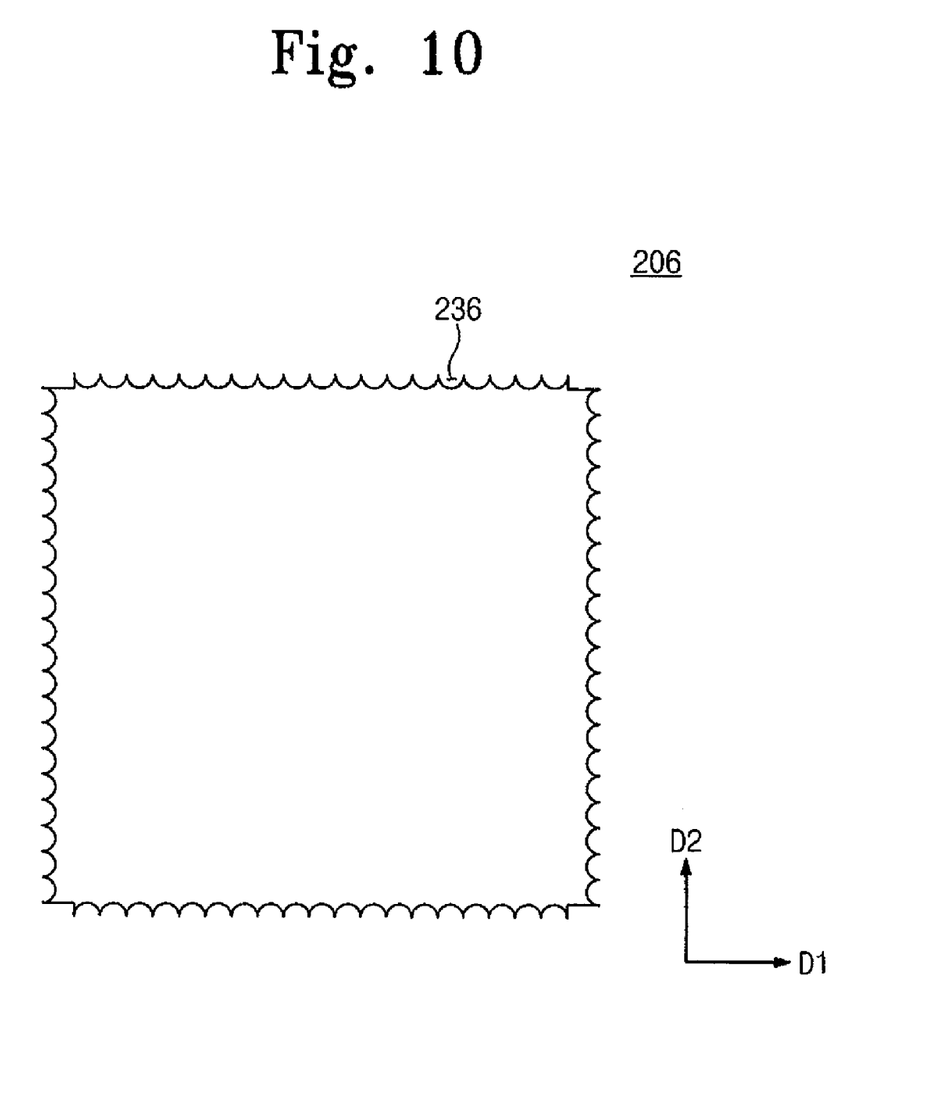

Referring to FIG. 10, when viewed in the plan view, the concave-convex patterns are formed at the edges of the pixel electrode 206. The concave-convex patterns are defined by concave sections 236 formed by removing the edges of the pixel electrode 206 in the form of a hemispheric shape.

Figure 11:
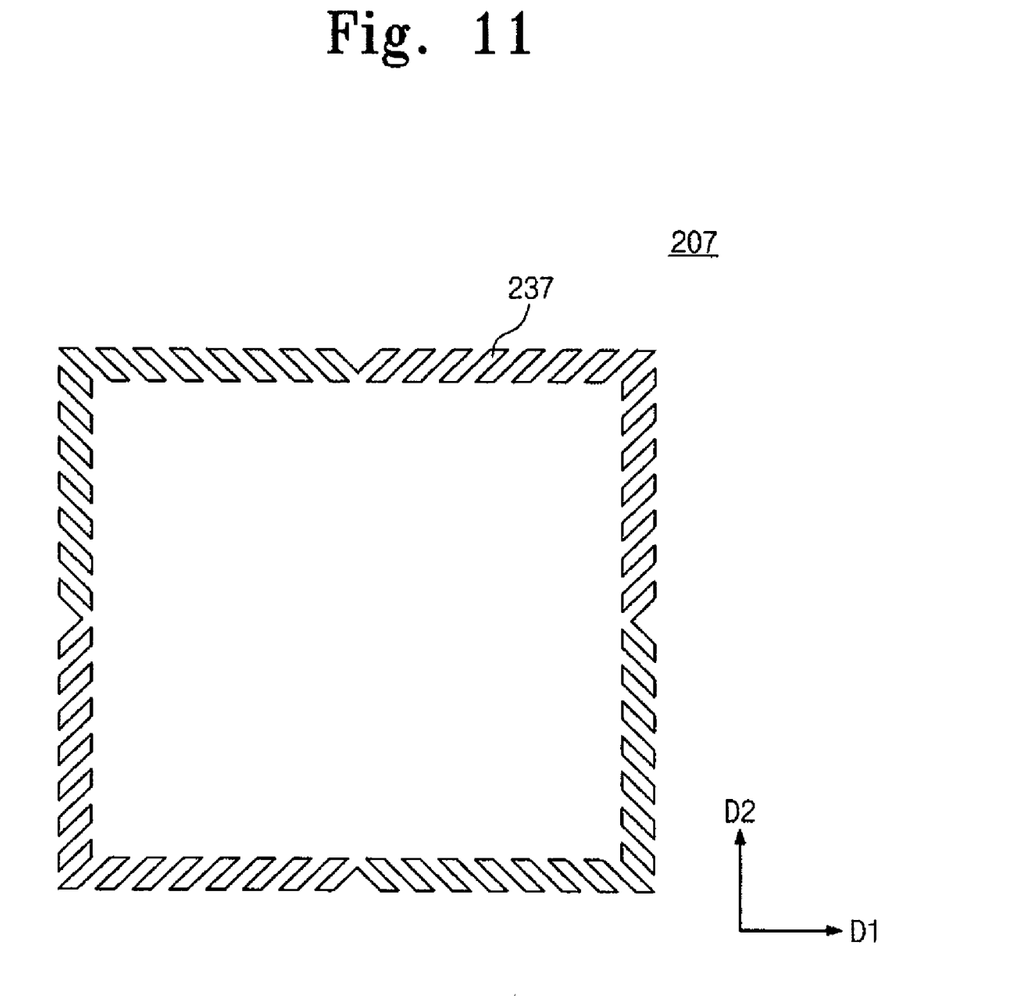

Referring to FIG. 11, when viewed in the plan view, the concave-convex patterns are formed at the edges of the pixel electrode 207. The concave-convex patterns are defined by convex sections 237 that extend while being inclined with respect to the first and second directions D1 and D2.

According to one or more embodiments of the display apparatus, the concave-convex patterns formed at the edges of the pixel electrode may vary the directions of the fringe fields generated from the edges of the pixel electrode, so that an area in which the fringe field is formed relative to one pixel area may be prevented from overlapping with a peripheral pixel area. Thus, the light leakage phenomenon may be prevented, in which the color displayed on one pixel area may be displayed on the peripheral pixel area.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An electrophoretic display apparatus comprising:
 a first substrate in which a plurality of pixel areas are defined;
 thin film transistors disposed on the first substrate;
 pixel electrodes provided in the pixel areas and electrically connected to the thin film transistors, respectively, and comprising concave-convex patterns at edges thereof when viewed in a plan view;
 a second substrate facing the first substrate;
 a common electrode provided on the second substrate; and
 an electrophoretic layer interposed between the first and second substrates.

2. The electrophoretic display apparatus of claim 1, wherein the concave-convex patterns comprise a plurality of convex sections that protrude from the edges of the pixel electrodes.

3. The electrophoretic display apparatus of claim 2, wherein each convex section comprises a rectangular shape when viewed in a plan view.

4. The electrophoretic display apparatus of claim 3, wherein each convex section comprises a chamfered edge.

5. The electrophoretic display apparatus of claim 3, wherein each convex section comprises a width of about 3 μm to about 6 μm and two adjacent convex sections are spaced apart from each other by an interval of about 3 μm to about 6 μm.

6. The electrophoretic display apparatus of claim 2, wherein the pixel electrodes are arranged in a first direction or a second direction substantially perpendicular to the first direction, and each convex section protrudes from the edge of the pixel electrode while being inclined with respect to the first direction and the second direction.

7. The electrophoretic display apparatus of claim 2, wherein each convex section comprises a hemispheric shape when viewed in a plan view.

8. The electrophoretic display apparatus of claim 2, wherein each convex section comprises a triangular shape when viewed in a plan view.

9. The electrophoretic display apparatus of claim 1, wherein the concave-convex patterns comprise concave sections formed by partially removing the edges of the pixel electrodes.

10. The electrophoretic display apparatus of claim 9, wherein each concave section comprises a hemispheric shape when viewed in a plan view.

11. The electrophoretic display apparatus of claim 2, wherein each convex section extends in an oblique direction when viewed in a plan view.

12. The electrophoretic display apparatus of claim 1, further comprising a color filter provided on the electrophoretic layer.

13. A display apparatus comprising:
 a first substrate comprising gate lines, data lines, and thin film transistors each of which is connected to a corresponding one of the gate lines and a corresponding one of the data lines, in which the gate lines cross the data lines to define a plurality of pixel areas;

a second substrate facing the first substrate;

a plurality of pixel electrodes provided in the pixel areas and electrically connected to the thin film transistors, respectively, and comprising concave-convex patterns at edges thereof when viewed in a plan view, in which the concave-convex patterns comprise convex sections and concave sections;

a common electrode provided on the second substrate; and a color filter provided on the first or second substrate in correspondence with the pixel areas.

14. The display apparatus of claim 13, wherein each convex section comprises a rectangular shape when viewed in a plan view.

15. The display apparatus of claim 14, wherein each convex section comprises a chamfered edge.

16. The display apparatus of claim 13, wherein the pixel electrodes are arranged in a first direction or a second direction substantially perpendicular to the first direction, and each convex section protrudes from the edge of the pixel electrode while being inclined with respect to the first direction and the second direction.

17. The display apparatus of claim 13, wherein each convex section comprises a hemispheric shape when viewed in a plan view.

18. The display apparatus of claim 13, wherein each convex section comprises a triangular shape when viewed in a plan view.

19. The display apparatus of claim 13, wherein each concave section comprises a hemispheric shape when viewed in a plan view.

20. The display apparatus of claim 13, wherein each convex section extends in an oblique direction when viewed in a plan view.

* * * * *